Patented Jan. 20, 1942

2,270,676

UNITED STATES PATENT OFFICE 2,270,676

SULPHONIC ACID AMIDE COMPOUND

Robert Behnisch, Josef Klarer, and Fritz Mietzsch, Wuppertal-Elberfeld, Germany, assignors to Winthrop Chemical Company, Inc., New York, N. Y., a corporation of New York No Drawing. Application August 6, 1937, Serial No. 157,808. In Germany August 20, 1936

18 Claims. (Cl. 260—397.7)

This invention relates to sulphonic acid amide compounds.

It is known that para-aminobenzene sulphonic acid amide and para-aminobenzene sulphonic acid anilide are active against streptococci infections of warm blooded individuals. These compounds, however, are not suitable for injection purposes since their mineral acid salts, because of the basicity of the starting materials, react acid to Congo red and their alkali metal salts, because of their strongly basic reaction, in subcutaneous injection cause necroses. In order to obtain readily soluble and neutrally reacting salts attempts have been made to introduce sulphonic acid and carboxylic acid groups into the nucleus containing the sulphonamide group. However, it has been established that for instance in the case of the para-aminobenzene sulphonic acid amide-meta-carboxylic acid and the para-aminobenzene sulphonic acid anilide-meta-carboxylic acid the therapeutic efficacy is considerably decreased thereby.

In accordance with the present invention new highly efficacious products are obtained which are readily soluble in water and yield in the form of their salts with bases neutrally reacting solutions which are suitable for injection purposes. The said products are prepared by introducing sulphonic acid or carboxylic groups into the aryl radical connected with the nitrogen atom of the sulphonic acid amide group of a p-amino-benzene sulphonic acid arylamide. The compounds thus obtained are distinguished by a much better stabilisation from other para-aminobenzene sulphonic acid amide compounds which contain attached to the para-amino-group acid groups in the form of formaldehyde-bisulphite radicals.

In the new products the amino group in the para-position may be free or substituted. Particularly suitable substituents are acyl radicals of the various aliphatic and aromatic, if desired substituted, carboxylic and sulphonic acids. Apart from simple lower and higher acyl radicals, such as acetyl, propionyl, butyryl, valeryl, octoyl, benzoyl, also for instance hydroxyacyl, alkoxyacyl and aminoacyl radicals, such as hydroxyacetyl, methoxyacetyl, butyloxyacetyl, aminoacetyl and aminopropionyl may be present as substituents of the amino group. The sulphonic acid and carboxylic acid radicals may be present in the aryl radical once or several times. The aryl radical is preferably taken from the benzene series. It may contain further substituents, such as free or substituted amino groups, alkyl groups or halogen atoms, whereas the benzene radical connected with the sulphur atom of the sulphonamide group preferably contains no substituents in the nucleus apart from the para-amino group.

For obtaining the above specified compounds the process can be carried out in such a manner that in the last working stage either the sulphonic acid amide bridge is caused to form, or the para-amino group or the sulphonic acid or carboxylic acid groups are introduced.

For the formation of the sulphonic acid amide bridge para-aminobenzene sulphonic acids or their reactive derivatives, for instance esters or halides, in which the para-amino group preferably contains substituents, for instance acyl radicals, as specified above, may be caused to react with aryl compounds which contain besides a primary or secondary amino group at least one sulphonic acid and/or carboxylic acid group; or para-amino-benzene sulphonic acid amides, the para-amino group of which as described above is preferably substituted and the sulphonic acid amide group of which contains at least one reactive hydrogen atom, may be caused to react with aryl compounds which besides at least one sulphonic acid and/or carboxylic acid group contain a substituent capable of being replaced which has been rendered reactive by the said acid group or further groups, for instance nitro group, the substituent being, for instance, a halogen atom.

The para-amino group may be caused to form from a substituent capable of being transformed into an amino group which stands in the para-position of a benezene nucleus of a benzene sulphonic acid arylamide containing all the other necessary groups as specified above. Thus, for instance, with the production of para-amino compounds, para-nitro-, para-nitroso-, para-azo- and para-hydrazo-compounds may be reduced, para-azomethine compounds hydrolyzed, para-hydroxy- and para-halogen-compounds caused to react with ammonia, primary or secondary amines, and para-carboxylic acid amides or hydrazides degraded according to the Hofmann or Curtius reaction.

For introducing the sulphonic acid and carboxylic acid groups into the arylide radical of para-aminobenzene sulphonic acid arylides the latter may be treated according to the methods customary for sulphonation or carboxylation, for instance with sulphuric acid or chlorsulphonic acid, or groups already present in the arylamide radical, convertible into sulphonic acid or carboxylic acid radicals, may be transformed into these groups. For this purpose for instance sulphonic acid or carboxylic acid esters, halides, amides and nitriles may be saponified, or the lower oxidation stages corresponding to the sulphonic acids or carboxylic acids, such as mercapto compounds, sulphonic acid derivatives, methyl groups, methylol groups and aldehydes may be oxidized to the sulphonic acid or carboxylic acid stage.

The invention is further illustrated by the following examples without being restricted thereto:

*Example 1.*—48 grams of para-acetylaminobenzene sulphonic acid chloride are added to a solution of 27.4 grams of 4-amino-benzoic acid, 8 grams of sodium hydroxide and 30 grams of sodium acetate in 200 ccs. of water at 30–40° C. while stirring until the whole has dissolved to a clear solution and a test portion on the addition of hydrochloric acid does not take up nitrous acid. The solution is decolorized with charcoal, filtered with suction and the 4-(para-acetylamino-benzene sulphonamido)-benzoic acid is precipitated by means of hydrochloric acid. By recrystallizing from alcohol it is obtained in coarse colorless crystals which melt at 248° C. with foaming.

The acetyl compound is heated to boiling with five times the quantity of 20% caustic soda solution for 2 hours under reflux. After cooling it is acidified with hydrochloric acid, the precipitate is filtered with suction, dissolved in sodium carbonate, precipitated with acid and finally recrystallized from dilute methanol. In this manner the 4-(para-aminobenzenesulphonamido)-benzoic acid is obtained in the form of small coarse prisms melting at 197° C. The compound is difficultly soluble in hot water, readily soluble in caustic soda solution with the formation of the sodium salt.

In an analogous manner when using 3-aminobenzoic acid the 3-(para-acetylaminobenzenesulphonamido)-benzoic acid is obtained in colorless crystals melting at 261° C. The compound is slightly soluble in water, somewhat more in 50% alcohol. By saponification the 3-(para-aminobenzenesulphonamido)-benzoic acid is obtained therefrom in the form of colorless leaflets melting at 197° C. which are readily soluble in hot alcohol and caustic soda solution and slightly soluble in boiling water.

When using 4-aminophenol-2-carboxylic acid the 4-(para-acetylaminobenzensulphonamido)-phenol-2-carboxylic acid is obtained in the form of yellowish leaflets which, when recrystallized from hot water melt at 242–245° C. with foaming and dark coloration. On saponification the 4-(para-aminobenzenesulphonamido) - phenol - 2 - carboxylic acid is produced in the form of yellow leaflets melting at 224° C. The compound is readily soluble in caustic soda solution, sodium carbonate solution, alcohol and methanol, slightly soluble in boiling water.

*Example 2.*—25 grams of para-acetylaminobenzenesulphonic acid chloride are added to a solution of 19.5 grams of the sodium salt of 4-aminobenzene sulphonic acid and 20 grams of sodium acetate in 150 ccs. of water at 30 to 40° C. while stirring until all has dissolved to a clear solution and a test portion after acidification with hydrochloric acid does not take up nitrous acid. After the addition of 30 grams of sodium chloride the sodium salt of 4-(para-acetylaminobenzenesulphonamido)-benzensulphonic acid precipitates on cooling which is recrystallized from a small quantity of water, if desired with the addition of some sodium chloride, and obtained in the form of well shaped leaflets of greasy lustre. On boiling with five times the quantity of 20% hydrochloric acid for 30 minutes under reflux the 4-(para-aminobenzenesulphonamido)-benzene-sulphonic acid crystallizes from the hot solution in coarse leaflets; it is filtered with suction after cooling. For purification it is dissolved in sodium carbonate solution, decolorized with charcoal and precipitated while hot with hydrochloric acid. The new compound carbonizes slowly on heating, dissolves only difficultly in hot water, somewhat more in boiling dilute alcohol and takes up the calculated quantity of nitrous acid in acid solution.

In a corresponding manner when using 3-amino-benzenesulphonic acid the sodium salt of the 3-(para-acetylaminobenzenesulphonamido)-benzenesulphonic acid is obtained as a white crystal powder which is readily soluble in water. By saponification with hydrochloric acid the 3-(para - aminobenzenesulphonamido) - benzene - sulphonic acid is obtained in colorless leaflets. The compound is readily soluble in hot water, slightly soluble in alcohol and can be readily diazotized.

When using 1-naphthylamine-4-sulphonic acid the sodium salt of the 4-(para-acetylamino-benbenesulphonamido)-naphthalenesulphonic acid is obtained in the form of colorless leaflets which are readily soluble in water and are salted out by means of sodium chloride. By saponification the 4-(para-aminobenzenesulphonamido) - naphtha - lene sulphonic acid is obtained. This compound forms a white powder which is difficultly soluble in water, readily soluble in caustic soda solution.

With 2.5-aminonaphthol-7-sulphonic acid the sodium salt of the 2-(para-acetylaminobenzenesulphonamido)-5-hydroxy-naphthalene - 7 - sul - phonic acid is obtained first as an oily mass which on triturating crystallizes in reddish leaflets. The compound is readily soluble in water and can be salted out by means of sodium chloride. By saponification the 2-(para-aminobenzenesulphonamido)-5-hydroxynaphthalene - 7 - sul - phonic acid is obtained therefrom in the form of yellow prisms. The new compound dissolves slightly in hot water, better in dilute alcohol and very readily in caustic soda solution.

With 2.8-aminonaphthol-6-sulphonic acid the sodium salt of the 2-(para-acetylaminobenzenesulphonamido) - 8 - hydroxynaphthalene- 6 - sulphonic acid is obtained. The compound first precipitates as an oily mass and crystallizes only after standing for a prolonged period. It is readily soluble in water. By saponification the 2 - (para-aminobenzenesulphonamido) - 8 - hydroxynaphthalene-6-sulphonic acid is obtained which after recrystallizing from water precipitates in colorless crystals. The compound dissolves slightly in cold, well in hot water and readily in caustic soda solution or sodium carbonate solution.

*Example 3.*—1-naphthylamino-3.6-disulphonic acid is caused to react with para-acetylaminobenzenesulphonic acid chloride as indicated in Example 2, until a test portion after the addition of hydrochloric acid does not take up nitrous acid. The filtered solution is concentrated considerably under reduced pressure and treated with saturated sodium chloride solution. After standing for a long time the disodium salt of the 1-(para-acetyl - aminobenzenesulphonamido) - naphtha - lene-3.6-disulphonic acid first precipitates as a gelatinous mass, which on triturating with fresh common salt solution solidifies to crystals. After filtering with suction it forms a white powder which is readily soluble in water and slowly carbonizes on heating. The said acetyl compound is heated to boiling with five times the quantity of 20% hydrochloric acid for 30 minutes, the solution is decolorized with charcoal, filtered with suction and concentrated considerably under reduced pressure. On the addition of sodium chloride solution the acid sodium salt of 1-(para-aminobenzenesulphonamido)-naphthalene - 3.6 - disulphonic acid precipitates in reddish-white crystals which are purified by dissolving in a small quantity of water and precipitating with sodium chloride. The new compound is readily soluble in water and dilute alcohol and is insoluble in pure alcohol.

In a corresponding manner when using 1-naphthylamino-3.8-disulphonic acid the disodium salt of 1 - (para-acetylaminobenzenesulphonamido) - naphthalene-3.8-disulphonic acid is obtained in the form of silky colorless needles which are readily soluble in water and are salted out by means of sodium chloride. By saponification of the acetyl group the acid sodium salt of 1-(para-aminobenzenesulphonamido)-naphthalene - 3.8 - disulphonic acid is obtained therefrom in the form of coarse crystals which are readily soluble in warm water and caustic soda solution.

When using aniline-3.5-disulphonic acid the sodium salt of 1-(para-acetylaminobenzenesulphonamido)-benzene-3.5-disulphonic acid is obtained as a white powder which is readily soluble in water and is only incompletely salted out by means of sodium chloride. By saponification the acid sodium salt of 1-(para-aminobenzenesulphonamido)-benzene-3.5-disulphonic acid is obtained therefrom. The compound forms a white powder which is readily soluble in water, can be salted out with sodium chloride and takes up nitrous acid readily.

*Example 4.*—21 grams of 2-bromo-benzoic acid, 21 grams of 4-acetylaminobenzenesulphonic acid amide and 17 grams of potassium carbonate are heated to boiling in 200 ccs. of amyl alcohol with the addition of a small quantity of copper powder for 8 hours. After the amyl alcohol has been distilled off the residue is dissolved in water, the solution filtered and acidified while hot with acetic acid. The precipitate separating is filtered with suction, dissolved in dilute caustic soda solution for removing the copper, filtered and precipitated with acetic acid while hot. The precipitate is filtered with suction and well washed with boiling water. In this manner the 2-(para-acetylaminobenzenesulphonamido)-benzoic acid is obtained in the form of colorless crystals melting at 245° C. By heating for 8 hours the 2-(par-aminobenezensulphonamido)-benzoic acid is obtained after working up in the usual manner which melts at 225° C. when redissolved from dilute methyl alcohol.

*Example 5.*—30 grams of the sodium salt of 4-(para-nitrobenzenesulphonamido)-benzene sulphonic acid are added to a boiling mixture of 50 grams of iron borings, 200 ccs. of water and 2 ccs. of acetic acid and heated to boiling for one hour while stirring. After cooling, the mixture is rendered alkaline with caustic soda solution, filtered and the filtrate acidified with hydrochloric acid. In this manner the 4-(para-amino-benzenesulphonamido)-benzene sulphonic acid is obtained which corresponds in all its properties with the compound described in Example 2.

For obtaining the starting material a solution of 20 grams of 4-aminobenzenesulphonic acid sodium and 25 grams of sodium acetate in 200 ccs. of water is mixed with 24 grams of 4-nitrobenzenesulphonic acid chloride at about 40° C. while stirring until a test portion of the reaction mixture, when treated with hydrochloric acid, does not take up any sodium nitrate. On the addition of sodium chloride the sodium chloride the sodium salt of the 4-(para-nitrobenzenesulphonamido)-benzenesulphonic acid precipitates which is obtained in the form of light yellow crystals on redissolving from a small quantity of water.

*Example 6.*—10 grams of 3-(para-acetylaminobenzene-sulphonamido)-benzonitril are heated with 30 ccs. of 20% caustic soda solution for 12 hours. After acidifying with acetic acid and recrystallization the 3-(para-aminobenzene-sulphonamido)-benzoic acid is obtained in the form of colorless leaflets melting at 197° C.

For obtaining the starting material a solution of 24 grams of 3-aminobenzonitril in 200 ccs. of acetone and 15 ccs. of pyridine is treated with 48 grams of 4-acetylamino-benezenesulphonic acid chloride and heated to boiling for one hour on the water bath. After pouring into water it is acidified with hydrochloric acid, the precipitate is filtered with suction and well washed with water. By redissolving from alcohol the 3-(para-acetylaminobenzene - sulphonamido) - benzonitril is obtained in the form of colorless crystals melting at 236° C.

We claim:

1. A compound of the formula:

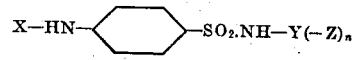

wherein X stands for a substituent selected from the group consisting of hydrogen, saturated aliphatic acyl and benzoyl groups, Y stands for a hydroxyl-free aryl radical selected from the group consisting of aryl radicals of the benzene and naphthalene series, Z stands for an acid group selected from the group consisting of sulphonic and carboxylic acid groups and $n$ stands for one of the numbers 1 and 2, which compound yields neutral aqueous solutions in the form of its salts with bases.

2. A compound of the formula:

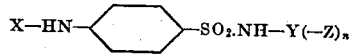

wherein X stands for a substituent selected from the group consisting of hydrogen, saturated aliphatic acyl and benzoyl groups, Y stands for a hydroxyl-free benzene radical, Z stands for an acid group selected from the group consisting of sulphonic and carboxylic acid groups and $n$ stands for one of the numbers 1 and 2, which compound yields neutral aqueous solutions in the form of its salts with bases.

3. A compound of the formula:

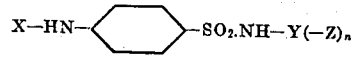

wherein X stands for a substituent selected from the group consisting of hydrogen, saturated aliphatic acyl and benzoyl groups, Y stands for a hydroxyl-free aryl radical selected from the group consisting of aryl radicals of the benzene and naphthalene series, Z stands for a sulphonic acid group and $n$ stands for one of the numbers 1 and 2, which compound yields neutral aqueous solutions in the form of its salts with bases.

4. A compound of the formula:

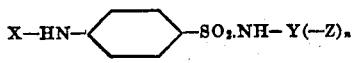

wherein X stands for a substituent selected from the group consisting of hydrogen, saturated aliphatic acyl and benzoyl groups, Y stands for a hydroxyl-free benzene radical, Z stands for a sulphonic acid group and $n$ stands for one of the numbers 1 and 2, which compound yields neutral aqueous solutions in the form of its salts with bases.

5. A compound of the formula:

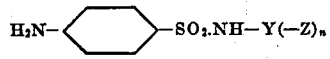

wherein Y stands for a hydroxyl-free aryl radical selected from the group consisting of aryl radicals of the benzene and naphthalene series, Z stands for an acid group selected from the group consisting of sulphonic and carboxylic acid groups and $n$ stands for one of the numbers 1 and 2, which compound yields neutral aqueous solutions in the form of its salts with bases.

6. A compound of the formula:

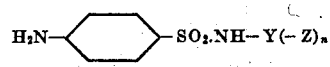

wherein Y stands for a hydroxyl-free benzene radical, Z stands for an acid group selected from the group consisting of sulphonic and carboxylic acid groups and $n$ stands for one of the numbers 1 and 2, which compound yields neutral aqueous solutions in the form of its salts with bases.

7. A compound of the formula:

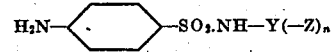

wherein Y stands for a hydroxyl-free aryl radical selected from the group consisting of aryl radicals of the benzene and naphthalene series, Z stands for a sulphonic acid group and $n$ stands for one of the numbers 1 and 2, which compound yields neutral aqueous solutions in the form of its salts with bases.

8. A compound of the formula:

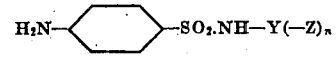

wherein Y stands for a hydroxyl-free benzene radical, Z stands for a sulphonic acid group and $n$ stands for one of the numbers 1 and 2, which compound yields neutral aqueous solutions in the form of its salts with bases.

9. A compound of the formula:

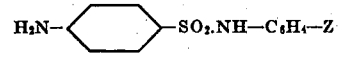

wherein Z stands for an acid group selected from the group consisting of sulphonic and carboxylic acid groups, which compound yields neutral aqueous solutions in the form of its salts with bases.

10. A compound of the formula:

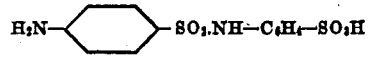

which yields neutral aqueous solutions in the form of its salts with bases.

11. A compound of the following formula:

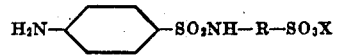

wherein R is a hydroxyl-free arylene radical from the group consisting of the benzene and naphthalene series and X is hydrogen.

12. A sulphanilylnaphthylamine sulphonic acid compound having the formula:

in which R is a hydroxyl-free naphthalene-sulphonic acid group.

13. N-sulphanilamidoaryl sulphonic acid compounds having the following formula:

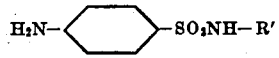

in which R' is a mononuclear hydroxyl-free aryl sulphonic acid group.

14. N-sulphanilamidoaryl sulphonic acid compounds having the following formula:

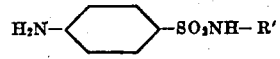

in which R' is a polynuclear aryl sulphonic acid group.

15. A compound of the formula:

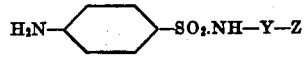

wherein Y stands for a hydroxyl-free aryl radical and Z stands for a sulphonic acid group which compound yields neutral aqueous solutions in the form of its salts with bases.

16. A compound of the formula:

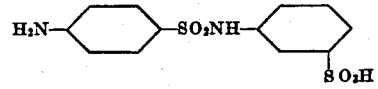

which yields neutral aqueous solutions in the form of its salts with bases.

17. A compound of the formula:

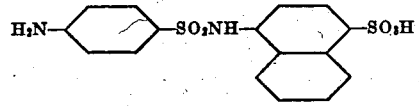

which yields neutral aqueous solutions in the form of its salts with bases.

18. N-sulphanilamidoaryl sulphonic acid compounds having the following formula:

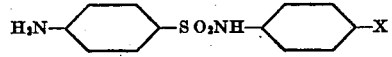

in which X is a sulphonic acid group.

ROBERT BEHNISCH.
JOSEF KLARER.
FRITZ MIETZSCH.